United States Patent
Cai et al.

(10) Patent No.: US 7,502,981 B2
(45) Date of Patent: Mar. 10, 2009

(54) AUTOMATIC REPEAT REQUEST (ARQ) SCHEME

(75) Inventors: Zhijun Cai, Euless, TX (US); Mansoor Ahmed, Fort Worth, TX (US); John D. Reed, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 486 days.

(21) Appl. No.: 11/379,273

(22) Filed: Apr. 19, 2006

(65) Prior Publication Data

US 2007/0250751 A1     Oct. 25, 2007

(51) Int. Cl.
  *H04L 1/18*     (2006.01)
(52) U.S. Cl. ...................................... 714/748
(58) Field of Classification Search ............... 714/748
  See application file for complete search history.

(56) References Cited

U.S. PATENT DOCUMENTS

2007/0150788 A1 *  6/2007  Zhuyan .................. 714/749
2007/0255994 A1 *  11/2007 Michel et al. ........... 714/751
2008/0028270 A1 *  1/2008  Parkvall et al. ......... 714/748

* cited by examiner

*Primary Examiner*—Esaw T Abraham
*Assistant Examiner*—Sam Rizk

(57) ABSTRACT

During operation each ACK/NAK feedback (200) comprises two fields (201-204). Each field corresponds to the status of previously-received data (e.g., slot, frame, TTI, ..., etc.). In a first embodiment, field 1 corresponds to the current received data status, while field 2 corresponds to the previous received data status if a NAK misinterpretation error occurs. If the receiver detects no misinterpretation error, the second field is simply left blank. Because each ACK/NAK feedback will comprise the reception status of currently received data, and prior-received data, a transmitter has two chances to receive the NAK/ACK if a NAK misinterpretation error occurs.

20 Claims, 4 Drawing Sheets

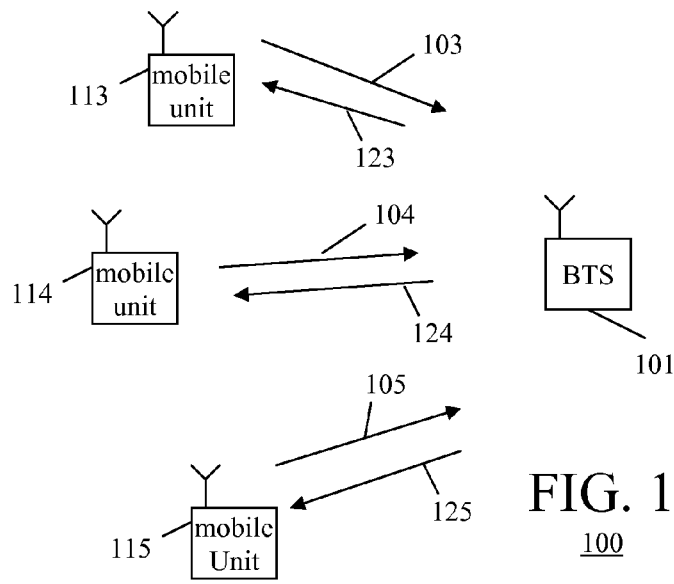
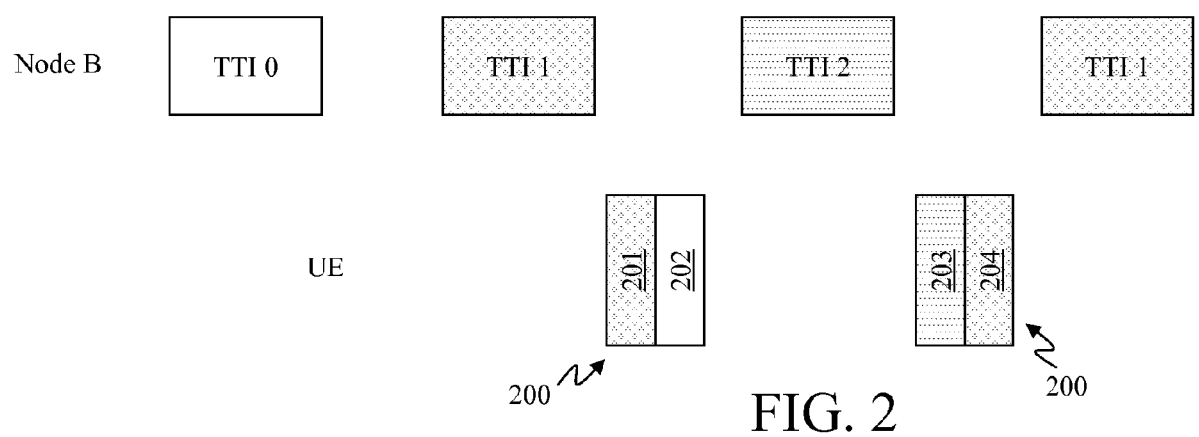
FIG. 1
100
FIG. 2

101

500

AUTOMATIC REPEAT REQUEST (ARQ) SCHEME

FIELD OF THE INVENTION

The present invention relates generally to systems that employ automatic repeat request (ARQ) schemes and in particular, to a method and apparatus for performing ARQ.

BACKGROUND OF THE INVENTION

Digital data transmissions over wired and wireless links sometimes may be corrupted, for instance, by noise in the link or channel, by interference from other transmissions, or by other environmental factors. Even with clear communication channels, which lend themselves to high data rates, it may not be possible to appropriately decode the data stream with the requisite error rates. In order to solve this problem, many current communication systems employ an automatic repeat request (ARQ) scheme for retransmission. In such systems an opportunity exists for requesting that data be retransmitted upon detection of an error by transmitting a negative acknowledgment (NAK) or an acknowledgment (ACK) back to the transmitter.

In more complex systems a hybrid ARQ scheme is employed. In systems employing a hybrid ARQ (HARQ) scheme, a receiver combines previously received erroneous transmissions of a packet of information with a newly received transmission in an effort to successfully ascertain the true contents of the packet. In other words, coded bits received on a first erroneous transmission are stored by the receiver and combined with the coded bits received on later transmissions thereby increasing the likelihood of a correct decoding on later transmissions. Similarly the coded bits received on the second or later transmissions are stored for combining with subsequent received bits.

Currently for HARQ schemes, when a NAK is received by the transmitter in error (misinterpretation error), the upper layer ARQ scheme is the only way to fix the error. This is because the HARQ procedure cannot detect the error since the transmitter assumes an ACK is received and starts to transmit new data, clearing the old data. There are several obvious disadvantages when performing upper layer ARQ. One disadvantage is that the upper layer ARQ incurs more delay than HARQ. Additionally, upper-layer ARQ utilizes more overhead when compared with the NAK/ACK transmission of HARQ. Finally, the upper ARQ scheme provides no combining capability between the original transmitted data and the retransmitted data. This loses the power combining gain compared with the HARQ scheme. As is evident, a need exists for a method and apparatus for performing ARQ that reduces the number of misinterpretation errors.

BRIEF DESCRIPTION OF THE DRAWINGS

FIG. 1 is a block diagram of a communication system.
FIG. 2 illustrates an ACK/NAK feedback.

DETAILED DESCRIPTION OF THE DRAWINGS

Figure 3:
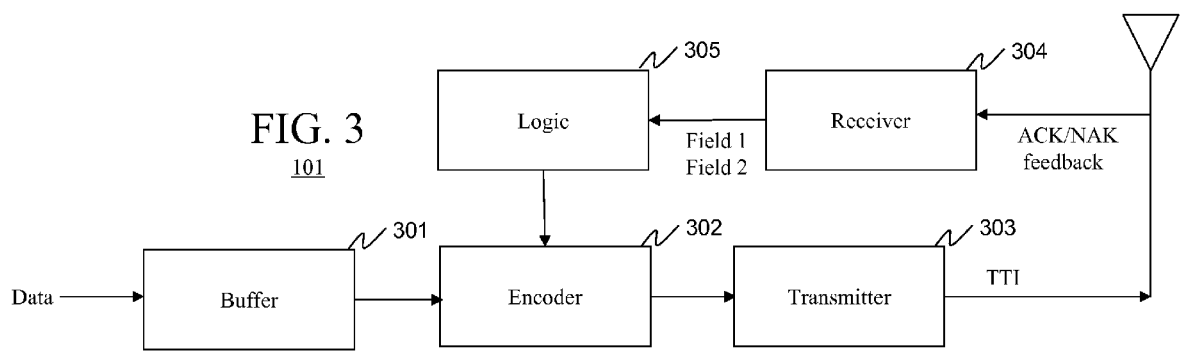
FIG. 3 is a block diagram of a base station.

To address the above-mentioned need a method and apparatus for performing ARQ transmission is described herein. During operation each ACK/NAK feedback comprises two fields. Each field corresponds to the status of previously-received data (e.g., slot, frame, TTI, . . . , etc.). In a first embodiment, field 1 corresponds to the current received data status, while field 2 corresponds to the previous received data status if a NAK misinterpretation error occurs. If the receiver detects no misinterpretation error, the second field is simply left blank. Because each ACK/NAK feedback will comprise the reception status of currently received data, and prior-received data, a transmitter has two opportunities to receive the NAK/ACK if a NAK misinterpretation error occurs.

The present invention encompasses a method for performing ARQ. The method comprises the steps of transmitting a current block of data, and receiving an ACK/NAK feedback. The ACK/NAK feedback comprises at least a first and a second field, wherein the first field represents an ACK/NAK status of the current block of data, and the second field represents an ACK/NAK status of a previous block of data. The current block of data or the previous block of data or a new block of data is transmitted based on the first and the second fields.

The present invention additionally encompasses a method for performing ARQ, The method comprises the steps of receiving a current block of data, determining if the current block of data is received in error, determining if the current block of data is new, and determining if a previously-received block of data was received in error. An ACK/NAK feedback is transmitted comprising at least a first and a second field, where the first field represents an ACK/NAK status of the current block of data, and the second field represents an ACK/NAK status of a previous block of data.

The present invention additionally comprises an apparatus comprising a transmitter transmitting an ACK/NAK feedback having at least a first and a second field, wherein the first field represents an ACK/NAK status of the current block of data, and the second field represents an ACK/NAK status of a previous block of data.

The present invention additionally comprises an apparatus having a receiver receiving an ACK/NAK feedback, the ACK/NAK feedback comprising at least a first and a second field, wherein the first field represents an ACK/NAK status of a current block of data, and the second field represents an ACK/NAK status of a previous block of data. The apparatus additionally comprises a transmitter retransmitting the current block of data or the previous block of data or a new block of data based on the first and the second fields.

Turning now to the drawings, wherein like numerals designate like components, FIG. 1 is a block diagram of communication system 100. Communication system 100 utilizes a next generation Global System for Mobile Communications (GSM) protocol, but in alternate embodiments communication system 100 may utilize other communication system protocols such as, but not limited to, the Wireless LAN standards such as 802.11b, a next generation CDMA architecture as described in the cdma2000 International Telecommunication Union-Radio communication (ITU-R) Radio Transmission Technology (RTT) Candidate Submission document, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Communication system 100 includes at least one Base Transceiver Station (BTS) 101 (sometimes referred to as a base station (BS) or Node B), and multiple mobile units (MUs) 113-115 (sometimes referred to as nodes or user equipment (UE)). Although not shown, communication system 100 additionally includes well known network elements such as Mobile Switching Centers (MSCs), Centralized Base Station Controllers (CBSCs) in a circuit switch network, or such as Radio Network Controller (RNCs), Gatekeepers (GKs) and GateWays (GWs) in a packet switch network. It is contemplated that network elements within communication system 100 are configured in well known manners with processors, memories, instruction sets, and the like, which function in any suitable manner to perform the function set forth herein.

As shown, mobile units 113-115 are communicating with base station 101 via uplink communication signals 103-105, respectively, while base station 101 is communicating with mobile units 113-115 via downlink communication signals 123-125, respectively. As discussed above, digital data transmissions over wired and wireless links sometimes may be corrupted, for instance, by noise in the link or channel, by interference from other transmissions, or by other environmental factors. In order to help correct corrupted transmissions, communication system 100 employs an HARQ retransmission scheme. In other words, bits received by mobile units in error on a first transmission are retransmitted increasing the likelihood of a correct decoding. The retransmission of bits is triggered by the mobile unit transmitting a NAK back to base station 101. When the mobile unit transmits an ACK back to the transmitter, the transmitter assumes the data was correctly received.

It is common in some designs to use On-Off-Keying (OOK) for an ACK/NAK transmission so that a bit is transmitted to represent an ACK, but nothing is transmitted to represent the NACK. This bit mapping is used since the NACK is typically transmitted more often and thus more can be saved by gating off the NACK transmission, however other mappings can also be used. With OOK signaling, a misinterpretation error is also possible by detecting an ACK when a NACK was transmitted by gating off the transmission, i.e. when nothing was sent to represent the NACK. This occurs because of the inexact detection of a signal in an environment with noise and interference.

As discussed above, for prior-art ARQ systems, when a NAK transmission is received by the transmitter in error (i.e., a misinterpretation error), the upper layer ARQ scheme is the only way to fix the error since the HARQ procedure cannot detect the error. (The transmitter assumes an ACK is received and starts to transmit new data clearing the old data). In order to address this issue, communication system 100 utilizes an HARQ scheme where each NAK/ACK feedback comprises two fields. Each field corresponds to a previous, but differing received data or transmission time interval (TTI). This is illustrated in FIG. 2. The transmission of the two bits of information 200 may occur simultaneously or consecutively and may be encoded and transmitted separately or together. One or both may be encapsulated with other data, messages, or control signals.

In FIG. 2, base station 101 transmits TTI 1 to user equipment (e.g., mobile unit 113). For each TTI received, mobile unit 113 will transmit ACK/NAK feedback 200 back to base station 101. As shown in FIG. 2, each NAK/ACK feedback is composed of two fields 201, 202 and 203, 204. First field 201 and 203 corresponds to a latest received TTI status, while second field 202 and 204 corresponds to a previous received TTI status if a NAK misinterpretation error occurs. If mobile unit 113 detects no misinterpretation error, the second field is not utilized (i.e., simply not transmit, i.e. a discontinuous transmission (DTX)). Therefore, for a single TTI transmission, base station 101 has two chances to receive the NAK/ACK if a NAK misinterpretation error occurs. The fields are separated hence the feedback combining for the same TTI from multiple feedback can be completed.

Thus in FIG. 2, base station 101 transmits TTI 1 to mobile unit 113. Mobile unit 113 receives TTI 1 in error, and transmits feedback 200 back to base station 101. Feedback 200 comprises field 201 and field 202. Field 201 corresponds to the latest-received transmission (TTI 1), while field 202 corresponds to a previously received transmission (TTI 0). Since TTI 1 was received in error, field 201 comprises a NAK. Additionally, since no misinterpretation error occurred for TTI 0, field 202 comprises a DTX (no transmission).

Because a NAK was sent for TTI 1, mobile unit 113 expects to receive TTI 1 again, but instead, mobile unit 113 receives a different TTI (TTI 2). Because the NAK'd TTI (frame) was not retransmitted, mobile unit 113 assumes that the NAK was received in error by base station 101. Thus, the next feedback 200 will comprise field 203, corresponding to TTI 2, and field 204, again corresponding to TTI 1. Field 204 may be transmitted with higher power to help assure that it is adequately received. Because base station 101 correctly received field 204, TTI 1 is again transmitted.

FIG. 3 is a block diagram of base station 101. As shown, base station 101 comprises buffer 301, encoder 302, transmitter 303, receiver 304, and logic unit 305. Buffer 301 comprises a storage means such as random-access memory for storage of data that is to be transmitted by transmitter 303. Encoder 302 is capable of encoding the buffered data via one of several encoding schemes (e.g., CC, BTC, LDPC, CTC or CTC IR sub-packets). HARQ operates at the FEC block level. Encoder 302 is responsible for generating the HARQ TTI's, as defined in the relevant section of the 3GPP 25.212 physical layer specification. The TTI's are combined by a mobile unit's FEC decoder as part of the decoding process. Finally, logic circuitry 305 comprises a microprocessor controller such as a Freescale PowerPC microprocessor, available from Freescale, Inc. Among other things, logic unit 305 analyzes the current field 1 and field 2 values to see which TTI's were received in error.

Figure 4:
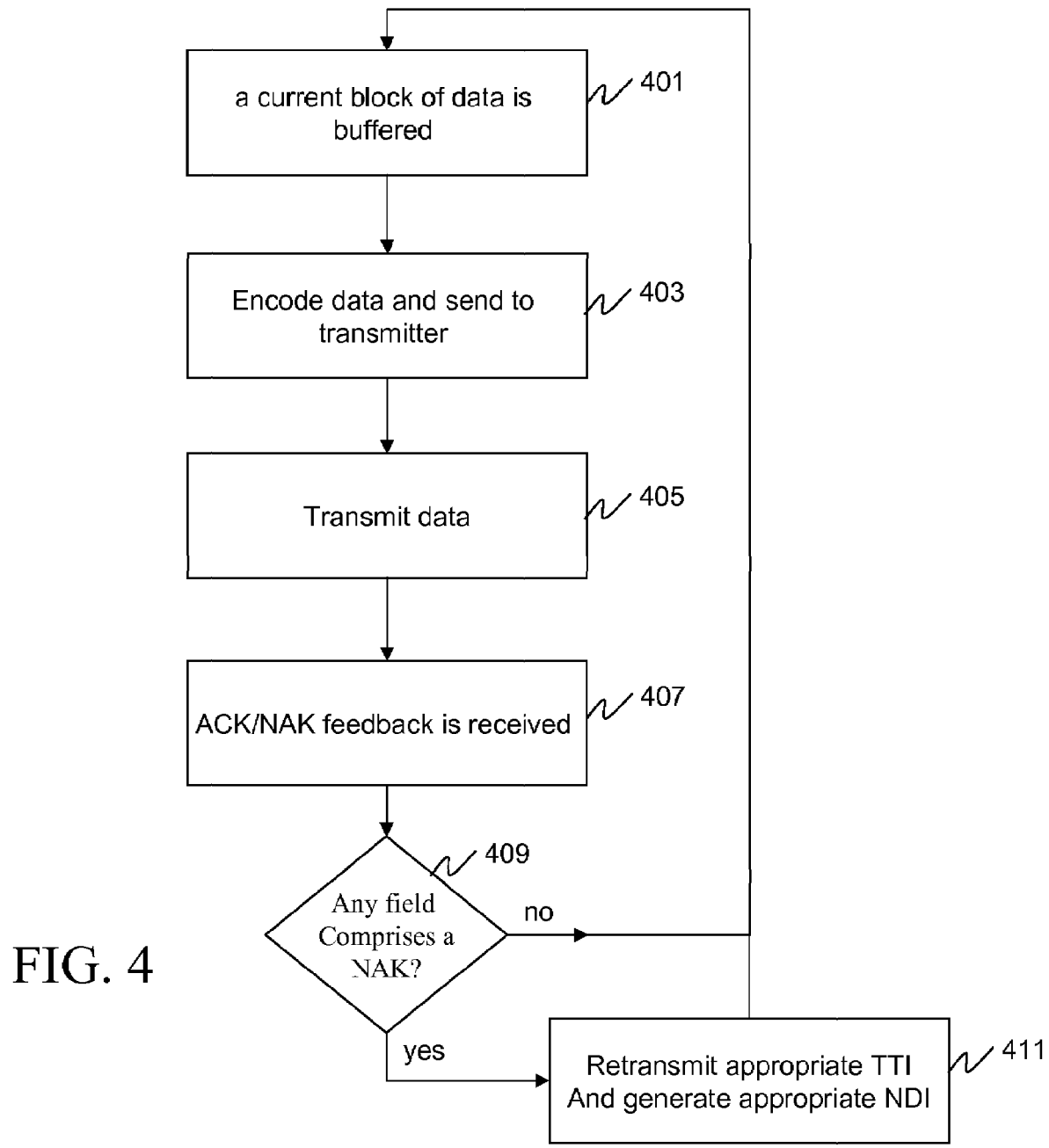
FIG. 4 is a flow chart showing operation of the base station of FIG. 3

FIG. 4 is a flow chart showing operation of the base station of FIG. 3. The logic flow begins at step 401 where a current block of data is buffered by buffer 301. The data is then encoded by encoder 302 at step 403 and sent to transmitter 303 where the current block of data (encoded) is transmitted to a mobile unit by transmitter 303 (step 405). At step 407, an ACK/NAK feedback is received by receiver 304. As discussed above, the ACK/NAK feedback comprises two fields, the first field comprises an ACK/NAK status of the current block of data, and the second field represents an ACK/NAK status of a previously-sent block of data (i.e., sent prior to the latest transmitted block of data). Logic circuitry 305 analyzes the fields and determines if any field comprises a NAK (step 409). If, any field comprises a NAK, the logic flow continues to step 411 where the encoder and transmitter are instructed to retransmit the appropriate block of data, and the appropriate New Data Indicator (NDI) otherwise the logic flow returns to step 401. As discussed, the NDI bits indicate if the current block of data is new data, the retransmissions of the last TTI or the one before the last, e.g., in FIG. 2, the retransmissions of the TTI 1 or TTI 2.

As is evident the current block of data, the previous block of data, or a new block of data is transmitted based on the first and the second fields. Additionally, the current block of data may comprise a current TTI, the previous block of data may comprise a previous TTI, and the new block of data may comprise a new TTI.

Figure 5:
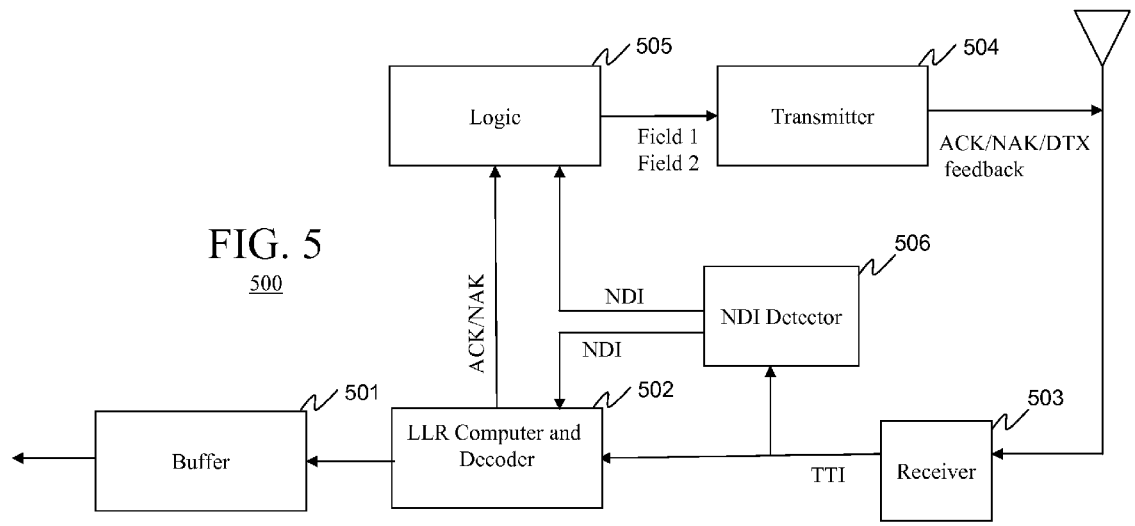
FIG. 5 is a block diagram of user equipment.

FIG. 5 is a block diagram of user equipment 500. User equipment 500 comprises transmitter 504, receiver 503, new-data indicator (NDI) detector 506, LLR computer and decoder 502, logic 505, and buffer 501. Receiver 503 receives a current TTI and the corresponding NDI bits. The NDI bits indicate whether the current block of data comprises new data, the retransmission of the last TTI, or the retransmissions of the one before the last. The NDI bits transmission can be out-of-band. The NDI bits may be signaled through alternative means such as the use of a preamble, which is transmitted at the beginning of a new data packet, which is typically used to indicate the format and possibly other characteristics of the data packet. For the case of the repeated first data packet, a specific preamble may be defined to indicate that the data is a repeated packet. This may be done by assigning a user more than one preamble address to indicate the two states. Other ways of modifying the addressing to the subscriber unit to indicate a repeated first data packet may be used, including an additional bit sent by a control channel or a specific message sent to the subscriber to indicate that the packet received is the repeated first packet. NDI detector 506 detects NDI bits and determines if new or old data is being received. The NDI bits are sent to both the logic circuitry 505 and LLR computer and decoder 502. LLR computer and decoder 502, utilizes the NDI bits for correct LLR combining.

Logic circuitry 505 receives the NDI bits and determines if a NACK was received in error. More particularly, logic circuitry 505 produces both ACK/NAK fields in the ACK/NAK response. Since logic circuitry will know when an NAK was sent, logic circuitry 505 will expect "old" data to be retransmitted. However, if new data is detected, then logic circuitry 505 will know that the NAK was erroneously received, and will again transmit the NAK in field 2. Thus, a NAK is transmitted in the second field if the current block of data is new and the previously-received block of data was received in error.

In a first embodiment, LLR computer and decoder 502 contains two buffers (not shown). One buffer stores the previous erroneous received TTI; while the other buffer may store the new TTI when a NAK misinterpretation error occurs (the transmitter sends new TTI due to a NAK error). In another embodiment, the new TTI transmitted from the transmitter are discarded when a NAK error occurs. In this case, NDI detector 506 only needs to identify whether the current transmission is new data or the retransmission, and LLR computer and decoder 502 only needs one buffer.

Logic circuitry 505 uses the both the NDI and the NAK/ACK generated from the decoder to determine how to populate field 1 and field 2 of the ACK/NAK response. Field 1 is always used for the current received TTI status (NAK/ACK). Field 2 is used if a NAK misinterpretation error occurs. Otherwise the DTX is used for field 2.

When a NAK is sent in field 2, the current reception of the data in TTI 2 is preferably held in a buffer while the data from TTI 1 is repeated. In some embodiments, where memory is not available to keep the first packet and second uncompleted packets, the packets would be started again and may be repeated up to a maximum number of times as in the normal reception without being combined with prior uncompleted packet data. In this case, the first packet would be retransmitted, followed by the retransmitted second packet.

Figure 6:
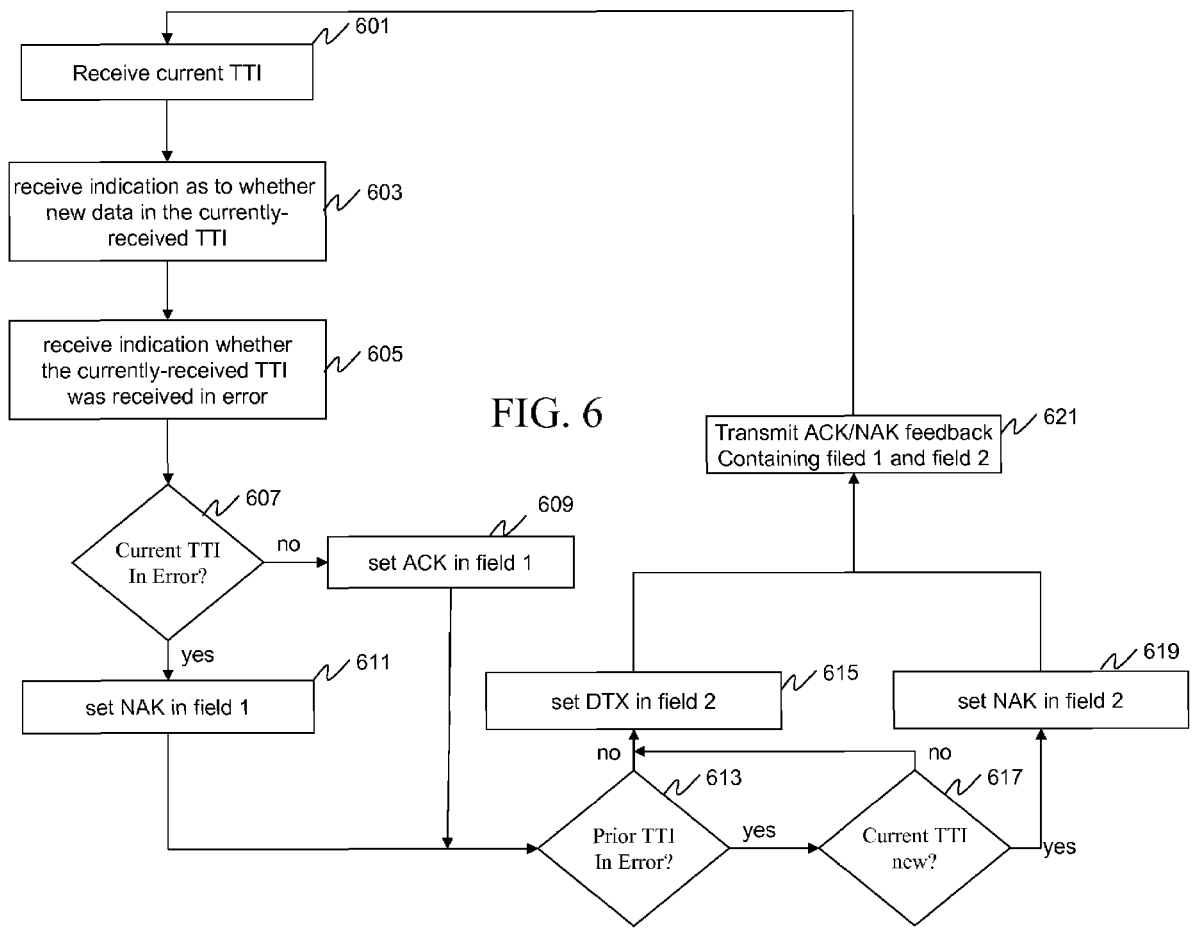
FIG. 6 is a flow chart showing operation of the user equipment of FIG. 5

FIG. 6 is a flow chart showing operation of the user equipment of FIG. 5. The logic flow begins at step 601 where receiver 503 receives a current encoded data block (current TTI) and passes the current block of data to LLR computer and decoder 502. Receiver 503 also receives the NDI bits and passes the NDI bits to NDI detector 506. At step 603, logic circuitry 505 receives an indication from NDI detector 506 on the status of the currently-received TTI (new data, the retransmissions of the last TTI or the one before the last) and at step 605 logic circuitry 505 receives an indication from LLR computer and decoder 502 as to whether the currently-received TTI was received in error.

At step 607 a determination is made by logic unit 505 as to whether the current TTI was in error, and if not, an ACK is set in field 1 (step 609), otherwise a NAK is set in field 1 (step 611). The logic flow continues to step 613 where logic circuitry 505 determines if the prior-received TTI (i.e., the TTI received prior to the currently-received TTI) was received in error. If the prior-received TTI was not received in error, the logic flow continues to step 615 where DTX is set in field 2, otherwise the logic flow continues to step 617. At step 617, logic circuitry 505 determines if the current TTI is new data (i.e., logic circuitry 505 determines if the NDI indicator detects new data). If, at step 617 it is determined that the data is not new, then the logic flow returns to step 615, otherwise the logic flow continues to step 619. If the logic flow executes step 619 then, both the prior TTI must have been received in error, and the current TTI must have contained new data. Because of this, the prior NAK must have been received in error by the transmitter. Thus, at step 619, a NAK is set in field 2 of the ACK/NAK feedback. Finally, at step 621, the ACK/NAK feedback is transmitted by transmitter 504.

As is evident, the above logic flow results in a NAK being transmitted in the second field if the current block of data is new and the previously-received block of data was received in error. Additionally, transmitting an ACK/NAK feedback in the second field may comprise the step of transmitting an On-Off-Keying (OOK) transmission in the second field.

While the invention has been particularly shown and described with reference to a particular embodiment, it will be understood by those skilled in the art that various changes in form and details may be made therein without departing from the spirit and scope of the invention. For example, the above procedure can also be used for ACK misinterpretation errors. Although ACK misinterpretation errors may not have as big effect as NAK misinterpretation errors, it also reduces the spectrum efficiency. Further, although this was illustrated for the forward link, it can also be done on the reverse link. Additionally, the above procedure can be used to further improve the performance by having each feedback contain N fields, with each field corresponding to each of the previous N TTIs. The number of required soft combining buffers is N and the number of NDI bit is ceil(log2(N)). It is intended that such changes come within the scope of the following claims.

The invention claimed is:

1. A method for performing Automatic Repeat Request (ARQ), the method comprising the steps of:
   transmitting with a transmitter a current block of data;
   receiving with a receiver a two-bit a Acknowledgment/Negative Acknowledgement (ACK/NAK) feedback containing only two bits, wherein a first bit of the two bits received represents an ACK/NAK status of the current block of data, and a second bit of the two bits received represents an ACK/NAK status of a previous block of data; and
   retransmitting with the transmitter the current block of data or the previous block of data based on the first and the second bits.

2. The method of claim 1 wherein the current block of data comprises a current Transmission Time Interval (TTI), the previous block of data comprises a previous TTI.

3. The method of claim 1 wherein the current block of data and the previous block of data comprises encoded data.

4. The method of claim 1 further comprising the step of:

transmitting new-data indicator (NDI) bits on the status of the current block of data, the NDI bits indicating whether the current block of data comprises new data, the retransmission of the last TTI, or the retransmissions of the one before the last.

5. A method for performing ARQ, the method comprising the steps of:
receiving with a receiver a current block of data;
determining if the current block of data is received in error;
determining if the current block of data is new;
determining if a previously-received block of data was received in error; and
transmitting with a transmitter, a two-bit ACK/NAK feedback containing only two bits, wherein the first bit of the two bits transmitted represents an ACK/NAK status of the current block of data, and the second bit of the two bits transmitted represents an ACK/NAK status of a previous block of data.

6. The method of claim 5 wherein a NAK is transmitted as the second bit if the current block of data is new and the previously-received block of data was received in error.

7. The method of claim 5 wherein transmitting an ACK/NAK feedback as the second bit comprises transmitting an On-Off-Keying (OOK) transmission as the second bit.

8. The method of claim 5 wherein the current block of data comprises a current TTI, and the previously-received block of data comprises a previously-received TTI.

9. The method of claim 5 wherein the current block of data and the previously-received block of data comprises encoded data.

10. The method of claim 5 farther comprising the step of:
receiving a new-data indicator (NDI); and
wherein the step of determining if the current block of data is new comprises the step of determining if the current block of data is new, or the retransmission of the last TTI, or the retransmissions of the one before the last, based on the NDI.

11. An apparatus comprising:
a transmitter transmitting a two-bit a ACK/NAK feedback containing only two bits, wherein the first bit of the two bits transmitted represents an ACK/NAK status of the current block of data, and the second bit of the two bits transmitted represents an ACK/NAK status of a previous block of data.

12. The apparatus of claim 11 further comprising:
a receiver receiving a current block of data; and
logic circuitry determining if the current block of data is received in error, determining if the current block of data is new, and determining if a previously-received block of data was received in error.

13. The apparatus of claim 12 wherein a NAK is transmitted in the second bit if the current block of data is new and the previously-received block of data was received in error.

14. The apparatus of claim 12 wherein the current block of data comprises a current TTI, and the previously-received block of data comprises a previously-received TTI.

15. The apparatus of claim 12 wherein the current block of data and the previously-received block of data comprises encoded data.

16. The apparatus of claim 12 wherein the receiver additionally receives a new-data indicator (NDI), and the logic circuitry determines if the current block of data is new, the retransmission of the last TTI, or the retransmissions of the one before the last, based on the NDI.

17. An apparatus comprising:
a receiver receiving a two-bit a ACK/NAK feedback containing only two bits, wherein the first bit of the two bits received represents an ACK/NAK status of a current block of data, and the second bit of the two bits received represents an ACK/NAK status of a previous block of data; and
a transmitter retransmitting the current block of data or the previous block of data or a new block of data based on the first and the second bits.

18. The apparatus of claim 17 wherein the current block of data comprises a current TTI, the previous block of data comprises a previous TTI, and the new block of data comprises a new TTI.

19. The apparatus of claim 17 wherein the block of data comprises encoded data.

20. The apparatus of claim 17 wherein the transmitter additionally transmits a new-data indicator (NDI) if the current block of data is new data, the retransmission of the last TTI, or the retransmissions of the one before the last.

* * * * *